US009046877B2

(12) United States Patent
Tang et al.

(10) Patent No.: US 9,046,877 B2
(45) Date of Patent: Jun. 2, 2015

(54) METHOD AND SYSTEM FOR MANAGING AN ALARM SIGNAL, ALARM CLOCK COMPRISING SUCH A SYSTEM

(75) Inventors: Kin-Wa Tang, Hong Kong (CN); Hin Leung Norman Chan, Shatin (CN); Peter Kong, Hong Kong (CN); Ka Man Lui, Hong Kong (CN)

(73) Assignee: WOOX Innovations Belgium NV, Anderlecht (BE)

( * ) Notice: Subject to any disclaimer, the term of this patent is extended or adjusted under 35 U.S.C. 154(b) by 46 days.

(21) Appl. No.: 14/113,745

(22) PCT Filed: Apr. 26, 2012

(86) PCT No.: PCT/IB2012/052089
§ 371 (c)(1),
(2), (4) Date: Nov. 8, 2013

(87) PCT Pub. No.: WO2012/147043
PCT Pub. Date: Nov. 1, 2012

(65) Prior Publication Data
US 2014/0049388 A1   Feb. 20, 2014

(30) Foreign Application Priority Data

Apr. 29, 2011  (WO) ................ PCT/CN2011/000752

(51) Int. Cl.
*G08B 29/00* (2006.01)
*G04C 21/28* (2006.01)
(Continued)

(52) U.S. Cl.
CPC  *G04C 21/28* (2013.01); *G04G 7/00* (2013.01); *G04G 13/02* (2013.01); *G06F 1/1632* (2013.01); *G06F 1/12* (2013.01)

(58) Field of Classification Search
CPC ..... G04G 13/02; G04G 11/00; G04G 13/021; G04G 9/00; G04G 13/00; G04G 21/00; G04G 7/00; G08B 21/24; G08B 21/06; G04C 21/28; G06F 1/1632
USPC .......... 340/575, 505, 540, 506; 368/244–249; 968/580
See application file for complete search history.

(56) References Cited

U.S. PATENT DOCUMENTS 6,151,278 A * 11/2000 Najarian ...................... 368/12
6,243,727 B1   6/2001 Watts, Jr.
(Continued)

FOREIGN PATENT DOCUMENTS

JP          181596 U     5/1989

OTHER PUBLICATIONS

RCA "RC130i Owner/User Manual-French"; Retrieved From the Internet: http://wwwvoxxsport.com/images/User%Manuals%20-%20FAQ%27s/RC1301_OM_FR.pdf On Jul. 5, 2012, 1 Page Document.
(Continued)

*Primary Examiner* — Eric M Blount
(74) *Attorney, Agent, or Firm* — Ryan Kromholz & Manion, S.C.

(57) ABSTRACT

The invention relates to a method and a system (SYS) for managing an alarm signal in a system comprising a first internal clock. The system is intended to cooperate with a portable player (PP) comprising a second internal clock and a screen (S). The method comprises the steps of: —setting the time of said first internal clock at the time of said second internal clock, —selecting a given time value being displayed on said screen, —memorizing said given time value in said system, —setting the time of said second internal clock at the time of said first internal clock, —triggering an alarm signal on said system when the time of said first internal clock reaches said given time value. According to this method, when the portable player is docked to the system, the system according to the invention does not require its own screen because the screen of the portable player is used to display the current time and the alarm time during setting it, resulting in a reduction of the costs of the system.

9 Claims, 7 Drawing Sheets

(51) Int. Cl.
  *G04G 7/00* (2006.01)
  *G04G 13/02* (2006.01)
  *G06F 1/16* (2006.01)
  *G06F 1/12* (2006.01)

(56) References Cited

U.S. PATENT DOCUMENTS

| | | | |
|---|---|---|---|
| 6,621,508 B1 * | 9/2003 | Shiraishi et al. | 715/810 |
| D572,702 S * | 7/2008 | Bart | D14/171 |
| D598,896 S * | 8/2009 | Garrett | D14/209.1 |
| 8,369,785 B2 * | 2/2013 | Dorogusker et al. | 455/41.3 |
| 8,593,912 B1 * | 11/2013 | Amores | 368/79 |
| 8,760,976 B2 * | 6/2014 | Kim | 368/244 |
| 2008/0123472 A1 * | 5/2008 | Bart | 368/10 |
| 2008/0161688 A1 | 7/2008 | Poland | |
| 2008/0253079 A1 * | 10/2008 | Robinson et al. | 361/686 |
| 2010/0250816 A1 | 9/2010 | Collopy et al. | |
| 2011/0170256 A1 * | 7/2011 | Lee | 361/679.44 |
| 2011/0249394 A1 * | 10/2011 | Nielsen et al. | 361/679.41 |

OTHER PUBLICATIONS

Philips Fidelio DS1100 Alarm Clock Blog, 3 Page Document, Dec. 12, 2010.
iLUV iMM190 App Station Advertisement, Accessory Jack, 1 Page Document, 2010.

* cited by examiner

METHOD AND SYSTEM FOR MANAGING AN ALARM SIGNAL, ALARM CLOCK COMPRISING SUCH A SYSTEM

CROSS-REFERENCE TO PRIOR APPLICATIONS

This application is the U.S. National Phase application under 35 U.S.C. §371 of International Application No. PCT/IB2012/052089, filed on Apr. 26, 2012, which claims the benefit of International Patent Application No. PCT/CN2011/000752, filed on Apr. 29, 2011. These applications are hereby incorporated by reference herein.

FIELD OF THE INVENTION

The invention relates to a method and a system for managing an alarm signal.

The invention may be used in the field of alarm clocks, more specifically docking alarm clocks for docking portable players.

BACKGROUND OF THE INVENTION

Alarm clocks are products which are nowadays widespread among consumers, and which are used by users to remind them to do something at a given preset alarm time, such as waking up in the morning. To this end, the alarm clock may generate a sound signal at said alarm time, such as music, a song, a buzz or a beep. The alarm clock comprises a screen to display the current time to users, and to display the alarm time to the user setting the alarm.

These known alarm clocks have limitations in the sense that the screen used to display the current time and the alarm time during setting, which involves additional costs. Moreover, it does not necessarily fit the preferences of users in terms of appearance of what is displayed, such as the font or the style.

OBJECT AND SUMMARY OF THE INVENTION

It is an object of the invention to propose an improved method and system for managing an alarm signal. The invention is defined by the independent claims. The dependent claims define advantageous embodiments.

The method according to the invention is employed for managing an alarm signal in a system comprising a first internal clock, the system being intended to cooperate with a portable player comprising a second internal clock and a screen.

The method comprises the steps of:
setting the time of said first internal clock at the time of said second internal clock,
selecting a given time value being displayed on said screen,
memorizing said given time value in said system,
setting the time of said second internal clock at the time of said first internal clock,
triggering an alarm signal on said system when the time of said first internal clock reaches said given time value.

The invention takes advantage of the existence of portable players which are nowadays widespread among consumers, in particular audio/video players, such as MP3/MP4 players. These portable players have a screen to display various information linked to the audio/video information, and have an internal clock generating the current time which is displayed on the screen. These portable players are equipped with a connector so that they can cooperate with external systems, either by docking or via cables, in particular to download audio/video content. In the method according to the invention, the system acts as an alarm clock. When the portable player is docked to the system, the system does not require its own screen, contrary to the alarm clock of the prior art, because the screen of the portable player is used to display the current time and the alarm time during setting it, resulting in a reduction of the costs of the system. As a consequence, if a user of a portable player is satisfied with the appearance of what is displayed on his/her portable player, this user will also be satisfied with the appearance of what is displayed when the portable player is docked to the system.

The invention also relates to a system comprising means for implementing the method according to the invention, and to an alarm-clock device comprising such a system.

Detailed explanations and other aspects of the invention will be given below.

BRIEF DESCRIPTION OF THE DRAWINGS

The particular aspects of the invention will now be explained by means of the embodiments described hereinafter and considered in connection with the accompanying drawings, in which identical parts or sub-steps are designated in the same manner.

DETAILED DESCRIPTION OF THE INVENTION

Figure 1:
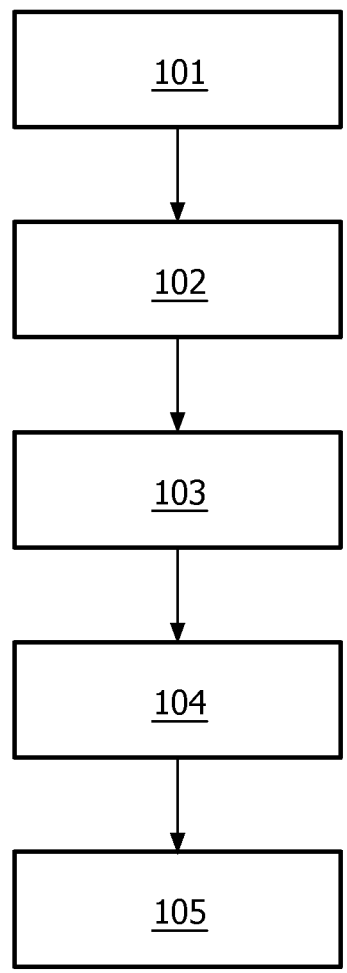
FIG. 1 depicts the flow chart of a method according to the invention.

FIG. 1 depicts the flow chart of a method according to the invention. The method is used for managing an alarm signal in a system comprising a first internal clock, the system being intended to cooperate with a portable player comprising a second internal clock and a screen. The portable player may correspond to any audio/video player, such as an MP3/MP4 player, having a screen to display various information linked to the audio/video information, and having an internal clock generating the current time, which is displayed on the screen. The portable player is equipped with a connector (e.g. female part) so that it can cooperate with the connector (e.g. male part) of an external system, either via a direct connection, such as docking, or via cables. The connector of the portable player is in particular used to download audio/video content from the external system it is connected to. In the present invention, the connector on the portable player is used for connection with the system according to the invention.

Figure 3A:
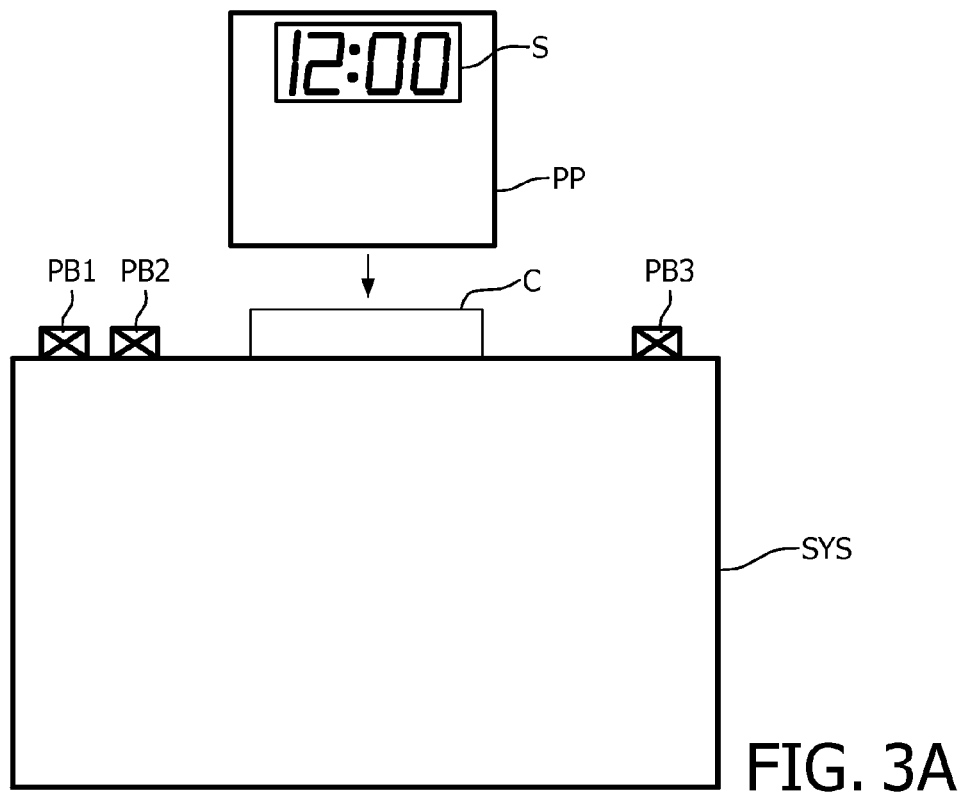
FIG. 3A to FIG. 3D depict a system according to the invention when a portable player is connected to a top part of said system.
Figure 3B:
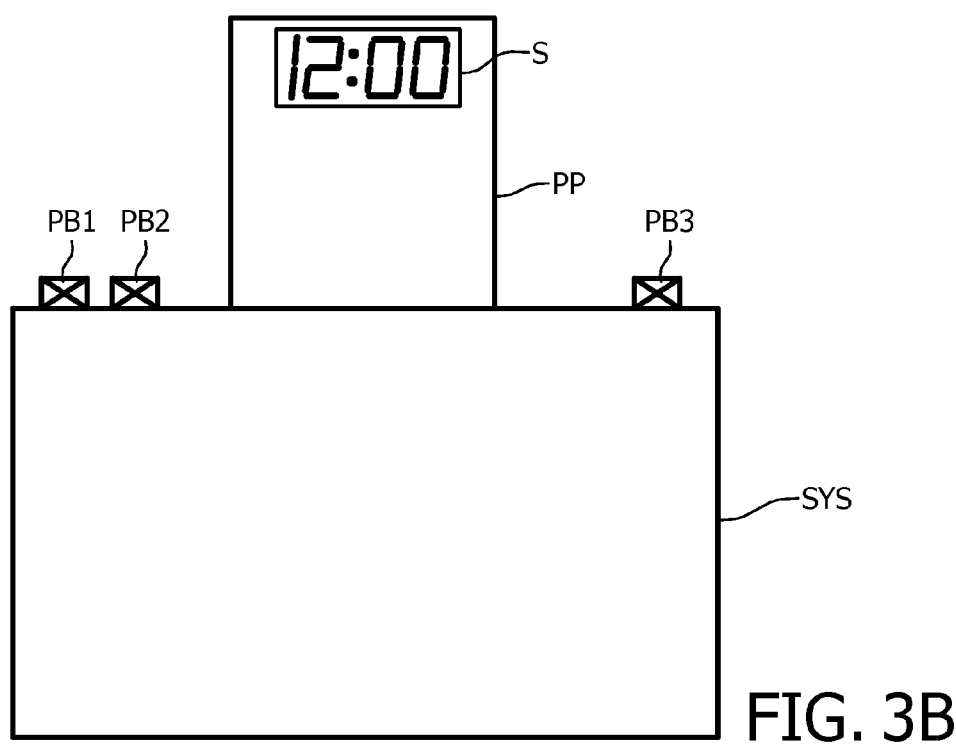
Figure 3C:
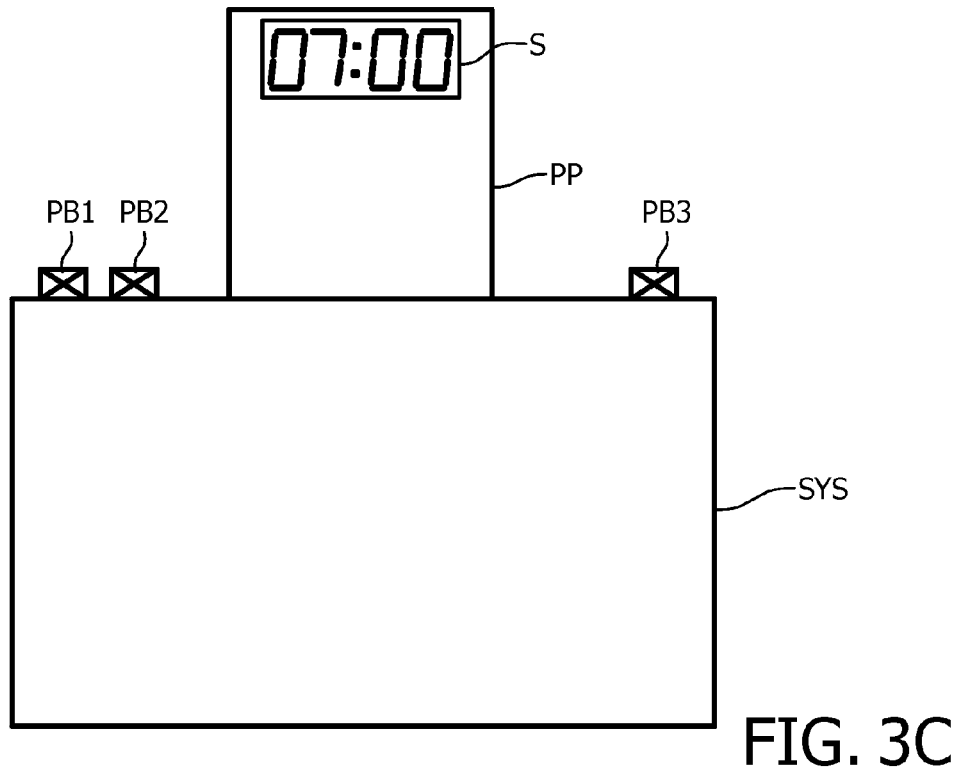
Figure 3D:
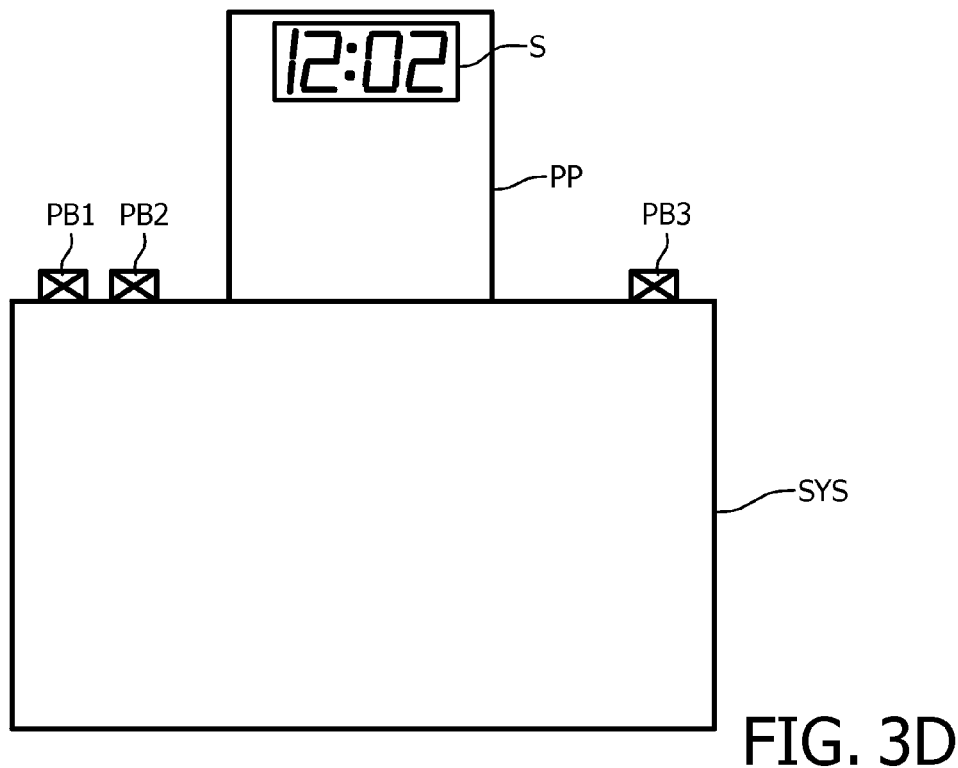
Figure 4:
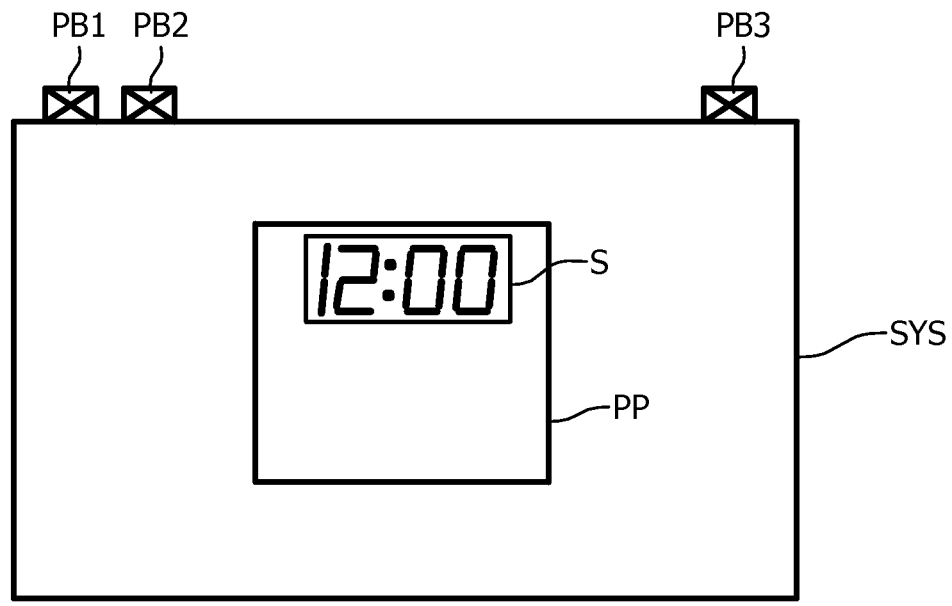
FIG. 4 depicts a system according to the invention when a portable player is connected to a central part of said system.
Figure 5:
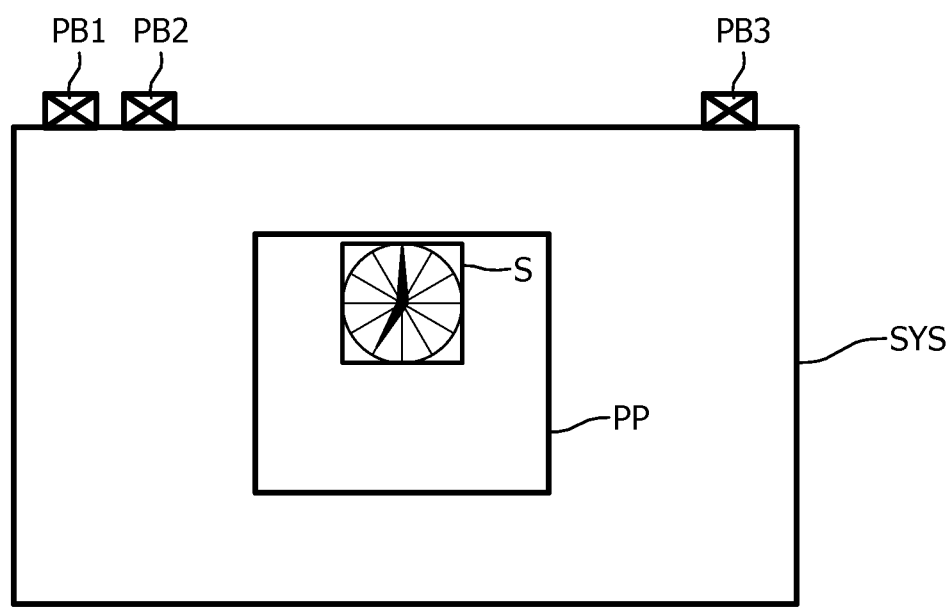
FIG. 5 depicts a system according to the invention connected to a portable player having an analog representation of time.

FIG. 3A illustrates a portable player PP before it is docked to the system SYS, wherein connector C (e.g. male part) used to dock the portable player is clearly shown. FIG. 3B, FIG. 3C and FIG. 3D illustrate the portable player PP when docked to the system SYS. FIG. 3A, FIG. 3B, FIG. 3C and FIG. 3D illustrate a system SYS comprising a connector (not shown)

positioned on the top part of system SYS so that the portable player PP is connected to this top part. Alternatively, as illustrated in FIG. 4, system SYS comprises a connector (not shown) positioned in a central part of system SYS, so that the portable player PP is connected to this central part. As illustrated, the screen of the portable player can display the time by means of a digital representation. Alternatively, as illustrated in FIG. 5, the screen of the portable player can display the time by means of an analog representation.

The portable player PP may have a square or rectangular form factor, and advantageously forms a flat and thin body. The first internal clock allows displaying the current time on the screen S of the portable player PP. For example, it is assumed that the current time is 12:00.

The method according to the invention comprises the steps of:
- setting 101 the time of the first internal clock at the time of said second internal clock: The time of the first internal clock is changed to the time of the second internal clock. In other words, the current time of the system SYS is synchronized with the current time of the portable player PP.
- selecting 102 a given time value being displayed on said screen: The user may operate some push buttons on the system SYS, for example PB1 for changing the hour setting, PB2 for changing the minute setting, resulting in a change of the displayed time on the screen S of the portable player PP. The user operates these push buttons until a desired time value corresponding to a desired alarm time has been reached and is displayed on the screen S. For example, let the desired given time value be 07:00, as illustrated in FIG. 3C.
- memorizing 103 said given time value in said system SYS: Since the system SYS is used as an alarm clock, the alarm time is memorized in the system SYS. It is thus guaranteed that in case the portable player is later undocked from system SYS, the system SYS still knows when the alarm signal should be triggered.
- setting 104 the time of said second internal clock at the time of said first internal clock: Since the current time of the portable player PP has been modified to said given time value, the current time must be restored to the second internal clock. To this end, the time of the second internal clock is changed to the time of the first internal clock which has continued to elapse during the step of selecting and memorizing. For example, if the steps of selecting and memorizing have taken 2 minutes, then the time of the first internal clock is now 12:02, meaning that the second internal clock is changed to this time value of 12:02, as illustrated in FIG. 3D.
- triggering 105 an alarm signal on said system SYS when the time of said first internal clock reaches said given time value: When the time of the first internal clock reaches the memorized alarm time, a sound is generated, such as music, a song, a buzz or a beep.

Preferably, the method according to the invention further comprises a step of generating an audio signal on said system SYS, used as said alarm signal. This is relevant when the user wants that the alarm signal triggered corresponds to a buzz or a beep pre-stored on the system SYS. In this case, the alarm signal can be triggered even if the portable player PP is not docked to the system SYS.

Preferably, the method according to the invention further comprises a step of receiving an audio signal from said portable player, used as said alarm signal. This is relevant when the user wants that the alarm signal triggered corresponds to music or a song pre-stored on the portable player PP. In this case, the portable player PP must be docked to the system SYS for the alarm signal to be triggered.

Preferably, in the case that the screen of the portable player PP comprises a backlight that can assume a switched-on state or a switched-off state, the method according to the invention further comprises a step of sending commands from said system SYS to said portable player PP to maintain the backlight of the screen S in the switched-on state. The switched-on state corresponds to a state where a user needs to read information displayed on the screen S. The switched-off state corresponds to a state where a user does not need to read information displayed on the screen S, equivalent to a stand-by mode which the portable player PP enters after a fixed duration without any user action on the portable player PP. The step of sending commands is used to force the portable player P to stay in the switched-on state, so that the current time is continuously displayed and visible on the screen S of the portable player P.

The invention also relates to a system SYS comprising means for implementing the method according to the invention.

Figure 2:
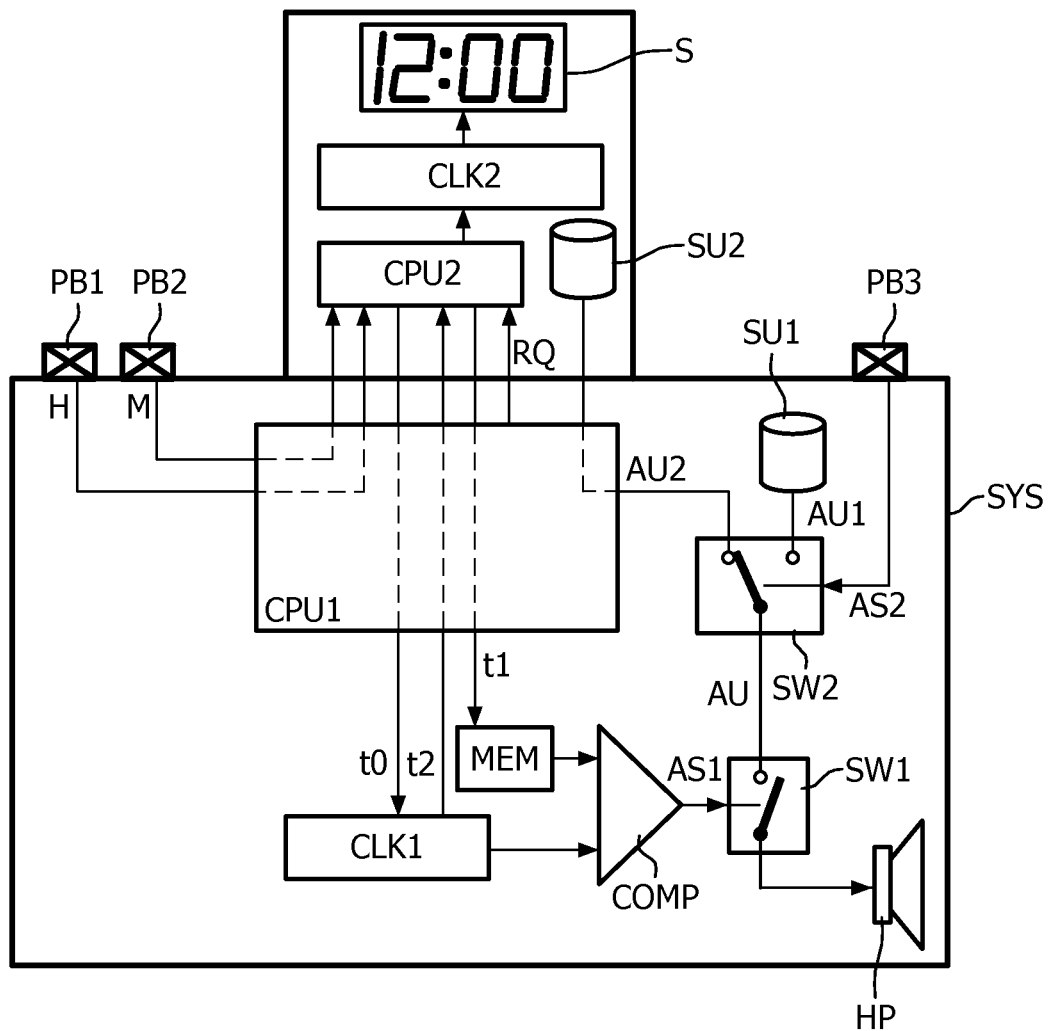
FIG. 2 depicts the functional implementation of a system according to the invention when connected to a portable player.

The system SYS, as illustrated in FIG. 2, is used for managing an alarm signal. The system SYS comprises a first internal clock CLK1. The system is intended to cooperate with a portable player PP comprising a second internal clock CLK2 and a screen S. The system further comprises:
- means for setting the time of the first internal clock CLK1 at the time t0 of the second internal clock CLK2: The time of the first internal clock CLK1 is changed to the time of the second internal clock CLK. In other words, the current time of the system SYS is synchronized with the current time t0 of the portable player PP. The portable player PP comprises a processor CPU2 which serves, amongst others, to control and drive the second internal clock CKL2, with a view to displaying the corresponding time value of CLK2 on screen S. Similarly, the system SYS comprises a processor CPU1 which serves, amongst others, to control and drive the first internal clock CKL1. Setting the time of the first internal clock CLK1 at the time t0 of the second internal clock CLK2 is done by a processor CPU2 sending the current time value t0 of the second internal clock CLK2 to processor CPU1.
- means for selecting a given time value being displayed on said screen S: push buttons situated on the system SYS can be used, for example PB 1 for changing the hour settings, PB2 for changing the minute settings, resulting in a change of the displayed time on the screen S of the portable player PP. By operating the push buttons PB1 and PB2, commands H and commands M can be generated which are sent to processor CPU2 via processor CPU1. As a result, the time indication of the second internal clock is modified. The user operates those push buttons until a desired given time value t1 corresponding to a desired alarm time t1 has been reached and is displayed on the screen S. For example, let the desired given time value be t1=07:00, as illustrated in FIG. 3C.
- a memory MEM for storing said given time value: Since the system SYS is used as an alarm clock, the alarm time t1 is memorized in the system SYS. It is thus guaranteed that in the case that the portable player is later undocked from system SYS, the system SYS still knows when the alarm signal should be triggered. To this end, the alarm time t1 is sent by processor CPU2 to processor CPU1, after which processor CPU1 sends the alarm time t1 to memory MEM.

means for setting the time of said second internal clock CLK2 at the time t2 of said first internal clock CLK1: Since the current time of the portable player PP has been modified to said given time value t1, the second internal clock CLK2 must be reset to the current time. To this end, the time of the second internal clock CLK2 is changed to the time t2 of the first internal clock CKL1 which has continued to elapse during the time the push buttons PB1 and PB2 were operated (and during storing the alarm time t1 in the memory MEM). For example, if operating the push buttons PB1 and PB2 (and storing the alarm time in the memory MEM) has taken 2 minutes, then the time t2 of the first internal clock CLK1 is now t2=12:02, meaning that the second internal clock CLK2 is changed to this time value of 12:02, as illustrated in FIG. 3D. To this end, the alarm time t2 is sent by processor CPU1 to processor CPU2, after which processor CPU2 changes the time of the second internal clock CLK2.

means for triggering an alarm signal when the time of said first internal clock CLK1 reaches said given time value: To this end, the system SYS comprises a unit COMP for comparing the time of the first internal clock CLK1 to the alarm time t1 stored in memory MEM. When the time of the first internal clock CLK1 reaches the value of alarm time t1, a first activation signal AS1 is generated by the unit COMP. The first activation signal AS1 is intended to close a first switch SW1, resulting in an audio signal AU being applied to a speaker SP. A sound is thus generated by speaker SP, such as music, a song, a buzz or a beep.

Preferably, the system SYS according to the invention further comprises means to generate an audio signal AU1 used as said alarm signal AU. For example, such means may comprise a storage unit SU1 for storing various audio signals, such as buzz or beep audio signals. In this case, the alarm signal can be triggered even if the portable player PP is not docked to the system SYS.

Preferably, the system SYS according to the invention further comprises means to receive, from said portable player PP, an audio signal AU2 used as said alarm signal AU. For example, such means may comprise a storage unit SU2 for storing various audio signals, such as music or songs. In this case, the portable player PP must be docked to the system SYS for the alarm signal to be triggered.

Advantageously, the system SYS according to the invention further comprises a second switch SW2, to switch from the audio signal AU1 to the audio signal AU2 (or from the audio signal AU2 to the audio signal AU1), under the action of a second activation signal AS2 generated by a push button PB3. The push button PB3 is intended to be activated by a user in order to select the source of the audio signal for the alarm signal.

Preferably, in the case that the screen of the portable player PP comprises a backlight that can assume a switched-on state or a switched-off state, the system SYS according to the invention further comprises means for sending commands RQ to said portable player PP, to maintain the backlight of the screen S in the switched-on state. The commands RQ are sent by processor CPU1 to processor CPU2. The switched-on state corresponds to a state where a user needs to read information displayed on the screen S. The switched-off state corresponds to a state where a user does not need to read information displayed on the screen S, equivalent to a stand-by mode which the portable player PP enters after a fixed duration without any user actions on the portable player PP. Commands RQ are sent to force the portable player P to stay in the switched-on state, so that the current time is continuously displayed and visible on the screen S of the portable player P. To this end, some dummy commands (also called non-functional commands) are periodically sent to reset a timer managed by processor CPU2, the timer being permanently compared to said fixed duration. Those commands are sent by processor CPU1 at intervals smaller than the fixed duration.

Figure 6A:
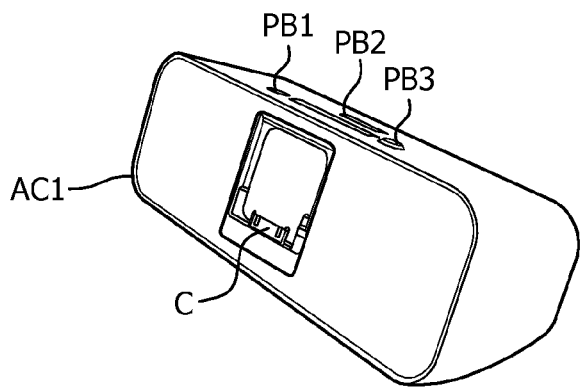
FIG. 6A to FIG. 6D depict three-dimensional views of a first alarm clock according to the invention.
Figure 6B:
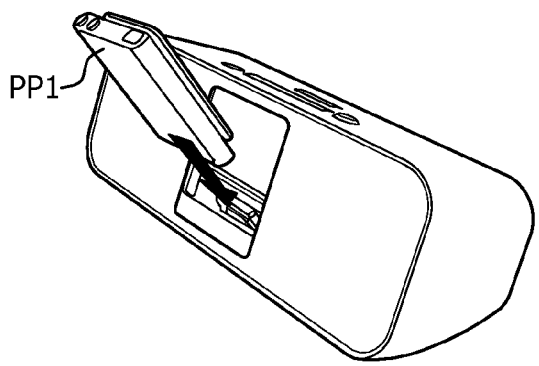
Figure 6C:
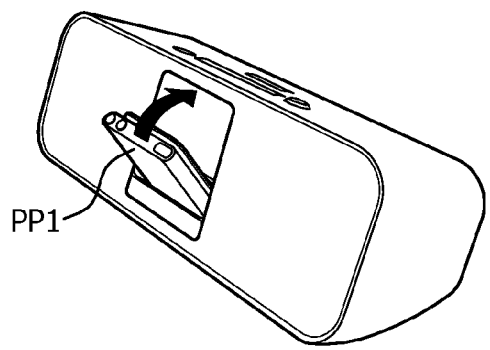
Figure 6D:
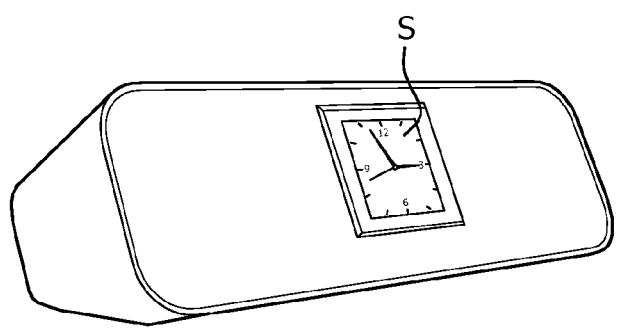

FIG. 6A to FIG. 6D depict three-dimensional views of a first alarm clock AC1 according to the invention. This alarm clock AC1 comprises a system SYS according to the invention as described above, and is intended to cooperate with a portable player PP1. FIG. 6A depicts the alarm clock AC1 before the portable player PP1 is docked by means of the connector C. FIG. 6B depicts the alarm clock AC1 when the portable player PP1 is being docked to the connector C. FIG. 6C depicts the alarm clock AC1 after the portable player PP1 has been docked to the connector C, and during adjusting said portable player PP1 such that its screen S is co-planar with the front face of alarm clock AC1. FIG. 6D depicts the alarm clock AC1 after the portable player PP1 has been docked to the connector C, so that a user of the alarm clock AC1 can perform the method according to the invention described above.

Figure 7A:
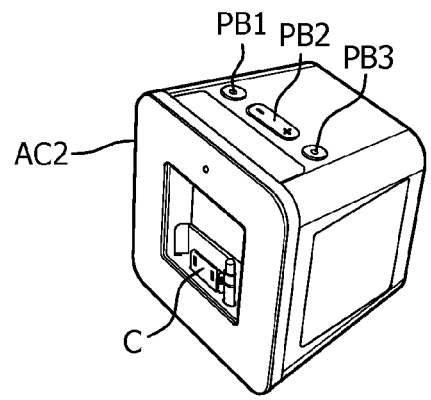
FIG. 7A to FIG. 7D depict three-dimensional views of a second alarm clock according to the invention.
Figure 7B:
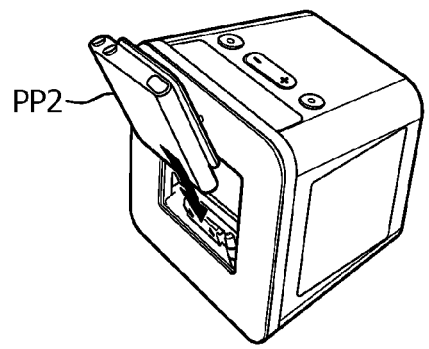
Figure 7C:
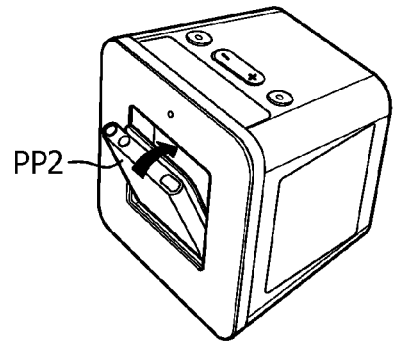
Figure 7D:
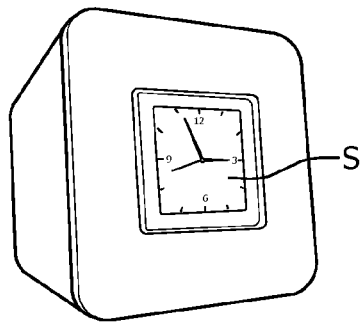

FIG. 7A to FIG. 7D depict three-dimensional views of a second alarm clock AC2 according to the invention. This alarm clock AC2 comprises a system SYS according to the invention as described above, and is intended to cooperate with a portable player PP2. FIG. 7A depicts the alarm clock AC2 before the portable player PP2 is docked by means of the connector C. FIG. 7B depicts the alarm clock AC2 during docking the portable player PP2 to the connector C. FIG. 7C depicts the alarm clock AC2 after the portable player PP2 has been docked to the connector C, and during adjusting the portable player PP2 such that its screen S is co-planar with the front face of alarm clock AC2. FIG. 7D depicts the alarm clock AC2 after the portable player PP2 has been docked to the connector C, so that a user of the alarm clock AC2 can perform the method according to the invention described above.

The above-described embodiments are only illustrative, and not intended to limit the technique approaches of the present invention. Although the present invention has been described in detail referring to preferred embodiments, those skilled in the art will understand that the technique approaches of the present invention can be modified or equally displaced without departing from the spirit and scope of the technique approaches of the present invention, which will also fall within the protective scope of the claims of the present invention. In the claims, the word "comprising" does not exclude other elements or steps, and the indefinite article "a" or "an" does not exclude a plurality. Any reference signs in the claims shall not be construed as limiting the scope.

The invention claimed is:

1. A method of managing an alarm signal in a system comprising a first internal clock, said system being intended to cooperate with a portable player comprising a second internal clock and a screen, said method comprising the steps of:
   setting the time of said first internal clock at the time of said second internal clock,
   receiving a given time value,
   storing said given time value in said system,
   restoring the time of said second internal clock at the time of said first internal clock,
   triggering an alarm signal on said system when the time of said first internal clock reaches said given time value.

2. Method as claimed in claim 1, further comprising a step of generating an audio signal on said system, for use as said alarm signal.

3. Method as claimed in claim 1, further comprising a step of receiving an audio signal from said portable player for use as said alarm signal.

4. Method as claimed in claim 1, wherein the screen of said portable player comprises a backlight that can take a switched-on state or a switched-off state, said method further comprising a step of sending one or more commands from said system to said portable player to maintain the backlight of said screen in switched-on state.

5. A system for managing an alarm signal, said system comprising a first internal clock, said system being intended to cooperate with a portable player comprising a second internal clock and a screen, said system further comprising:
   means for setting the time of said first internal clock at the time of said second internal clock,
   means for receiving a given time value,
   a memory for storing said given time value,
   means for restoring the time of said second internal clock at the time of said first internal clock,
   means for triggering an alarm signal when the time of said first internal clock reaches said given time value.

6. System as claimed in claim 5, further comprising means to generate an audio signal used as said alarm signal.

7. System as claimed in claim 5, further comprising means to receive from said portable player an audio signal for use as said alarm signal.

8. System as claimed in claim 5, wherein the screen of said portable player comprises a backlight that can take a switched-on state or a switched-off state, said system further comprising means for sending one or more commands to said portable player to maintain the backlight of said screen in switched-on state.

9. An alarm-clock comprising a system as claimed in claim 5.

* * * * *